US012573538B2

(12) United States Patent
Iwata et al.

(10) Patent No.: US 12,573,538 B2
(45) Date of Patent: Mar. 10, 2026

(54) COIL DEVICE

(71) Applicant: TDK CORPORATION, Tokyo (JP)

(72) Inventors: Hiroyuki Iwata, Tokyo (JP); Kiyofumi Fujiwara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 879 days.

(21) Appl. No.: 17/846,804

(22) Filed: Jun. 22, 2022

(65) Prior Publication Data

US 2022/0406514 A1 Dec. 22, 2022

(30) Foreign Application Priority Data

Jun. 22, 2021 (JP) ................................ 2021-103441

(51) Int. Cl.

*H01F 27/24* (2006.01)
*H01F 27/28* (2006.01)
*H01F 27/29* (2006.01)
*H01F 27/34* (2006.01)

(52) U.S. Cl.

CPC ......... *H01F 27/2823* (2013.01); *H01F 27/24* (2013.01); *H01F 27/29* (2013.01); *H01F 27/34* (2013.01)

(58) Field of Classification Search

CPC .................................................. H01F 27/2823
USPC ........................................................ 336/212
See application file for complete search history.

(56) References Cited

U.S. PATENT DOCUMENTS

| | | | | |
|---|---|---|---|---|
| 6,292,083 | B1 * | 9/2001 | Tajima | H01F 27/292 336/209 |
| 2011/0006867 | A1 * | 1/2011 | Oki | H01F 27/292 336/192 |
| 2016/0217919 | A1 * | 7/2016 | Iwata | H01F 27/29 |
| 2016/0240303 | A1 * | 8/2016 | Narisawa | H01F 27/29 |
| 2020/0243251 | A1 * | 7/2020 | Yoshino | H01F 41/069 |

FOREIGN PATENT DOCUMENTS

| | | | |
|---|---|---|---|
| JP | H08-64433 | A | 3/1996 |
| JP | 2015-133418 | A | 7/2015 |
| JP | 2016-134590 | A | 7/2016 |
| JP | 2020-120089 | A | 8/2020 |

* cited by examiner

*Primary Examiner* — Ronald Hinson
(74) *Attorney, Agent, or Firm* — Oliff PLC

(57) ABSTRACT

A coil device includes a magnetic core, a first wire and a second wire, and a first terminal electrode and a second terminal electrode. The magnetic core includes a winding core portion and a flange portion. A first end of the first wire is connected to a first wire-joint portion of the first terminal electrode. A first end of the second wire is connected to a second wire-joint portion of the first terminal electrode. A second end of the first wire is connected to a first wire joint portion of the second terminal electrode. A second end of the second wire is connected to a second wire-joint portion of the second terminal electrode. The first wire-joint portion and the second wire-joint portion are arranged away from each other. The first wire-joint portion and the second wire joint portion are arranged away from each other.

10 Claims, 13 Drawing Sheets

COIL DEVICE

BACKGROUND OF THE INVENTION

The present invention relates to a coil device such as a power inductor used in, for example, a DC-DC converter.

As an inductor, a coil in which a wire is wound around a winding tube of a core is used (Patent Document 1). In the vertical-type coil device described in Patent Document 1 in which the winding tube is perpendicular to a mounting surface, the terminal electrode and the wire can be joined by laser welding on the side surface of the flange portion. Thus, compared with the horizontal-type coil devices, the coil device of Patent Document 1 has an advantage of being able to perform a strong and reliable wire joint operation.

In accordance with the recent increase in electric current of electronic devices, the increase in electric current of coil devices is also required. In the conventional coil devices, however, when a thick wire with low resistance is used corresponding with the increase in electric current, leading ends of the thick wire are hard to bend, which complicates a wire joint operation and enlarges coil devices.

Patent Document 1: JP2016134590 (A)

BRIEF SUMMARY OF THE INVENTION

The present invention has been achieved under such circumstances. It is an object of the present invention to provide a coil device that can be downsized with high electric current.

To achieve the above object, a coil device according to the present invention comprises:

- a magnetic core including a winding core portion and a flange portion;
- a first wire and a second wire wound around the winding core portion; and
- a first terminal electrode and a second terminal electrode attached to the flange portion so as to be insulated from each other, wherein

- a first end of the first wire is connected to a first wire joint portion of the first terminal electrode,
- a first end of the second wire is connected to a second wire-joint portion of the first terminal electrode,
- a second end of the first wire is connected to a first wire-joint portion of the second terminal electrode,
- a second end of the second wire is connected to a second wire-joint portion of the second terminal electrode,
- the first wire-joint portion and the second wire-joint portion of the first terminal electrode are arranged away from each other, and
- the first wire-joint portion and the second wire-joint portion of the second terminal electrode are arranged away from each other.

In the coil device according to the present invention, the electric current between the first terminal electrode and the second terminal electrode separately flows through at least a coil consisting of the first wire and a coil consisting of the second wire. Thus, it is possible to reduce the electric current flowing through the single first wire or second wire and increase the total electric current flowing between the first terminal electrode and the second terminal electrode. Thus, it is possible to achieve the coil device applicable for a large electric current even without using a thick wire.

Since it is not necessary to use a thick wire, leading ends (first ends or second ends/the same applies hereinafter) of the wires are easily bent, the wire joint operation is facilitated, and the reliability of the joint strength between the leading ends of the wires and the terminal electrodes at the wire joint portions is also improved. Moreover, since it is not necessary to use a thick wire, it is not accordingly necessary to increase the thickness of the flange portion of the magnetic core, and the coil device can also be downsized in this respect.

Moreover, since the first wire-joint portion and the second wire-joint portion of each terminal electrode are arranged away from each other, the leading end of the wire and the terminal electrode at each wire-joint portion are easily separately connected by, for example, laser welding. The thermal influence of the connection operation at any of the wire-joint portions is less likely to adversely affect the other wire-joint portions, and the connection reliability at the wire-joint portions is improved.

Preferably, the first wire-joint portion and the second wire-joint portion of the first terminal electrode are arranged opposite to each other along one side surface of the flange portion, and the first wire-joint portion and the second wire-joint portion of the second terminal electrode are arranged opposite to each other along the other side surface of the flange portion.

In this structure, the first wire-joint portion and the second wire-joint portion of each terminal electrode are easily arranged away from each other. Thus, the leading end of the wire and the terminal electrode at each wire-joint portion are easily separately connected by, for example, laser welding. The thermal influence of the connection operation at any of the wire joint portions is less likely to adversely affect the other wire-joint portions, and the connection reliability at the wire-joint portions is improved. Moreover, the wire-joint portions are not arranged on the outer end surface of the flange portion (the mounting surface side), but arranged on the side surface of the flange portion, and the low profile of the coil device can thereby be achieved.

Preferably, the first wire-joint portion of the first terminal electrode and the first wire-joint portion of the second terminal electrode are arranged diagonally across the winding core portion, and the second wire-joint portion of the first terminal electrode and the second wire-joint portion of the second terminal electrode are arranged diagonally across the winding core portion.

In this structure, the length from the first wire joint portion of the first terminal electrode to which the first end of the first wire is connected to the first wire-joint portion of the second terminal electrode to which the second end of the first wire is connected is easily substantially the same as the corresponding length of the second wire. The corresponding length of the second wire is the length from the second wire-joint portion of the first terminal electrode to which the first end of the second wire is connected to the second wire-joint portion of the second terminal electrode to which the second end of the second wire is connected. When these lengths are substantially the same, the electric current flowing through the coil consisting of the first wire and the electric current flowing through the coil consisting of the second wire easily become substantially the same. Thus, it is easy to maximize the electric current flowing through the coil device.

Preferably, the first terminal electrode includes a first attachment piece attached to an outer end surface of the flange portion, and the second terminal electrode includes a second attachment piece attached to an outer end surface of the flange portion. When these attachment pieces are attached to the outer end surface of the magnetic core by adhesive or so, the first terminal electrode and the second terminal electrode are easily separately attached to the flange portion.

Preferably, the first terminal electrode further includes wire-joint rising pieces each provided with the first wire-joint portion and the second wire-joint portion and rising from opposite edges of the first attachment piece toward respective side surfaces of the flange portion, and the second terminal electrode further includes wire-joint rising pieces each provided with the first wire-joint portion and the second wire-joint portion and rising from opposite edges of the second attachment piece toward respective side surfaces of the flange portion.

Each of the wire joint rising pieces may be provided with a hold piece for holding and temporarily fixing the leading end of each wire. Each of the wire-joint portions is formed by contacting the leading end of each wire with each wire-joint rising piece and subjecting them to laser welding.

Preferably, notches are formed on the side surfaces of the flange portion where the wire-joint rising pieces are arranged. When the wire-joint rising pieces enter the notches, the wire-joint portions are contained in the notches and can be prevented from protruding outside the flange portion. As a result, the coil device is downsized, the wire-joint portions are less likely to collide with other parts, and the connection reliability of the wire-joint portions is improved.

Preferably, a recess is formed on an outer end surface of the flange portion, and the first terminal electrode or the second terminal electrode includes an inner rising piece for loosely entering the recess.

In this structure, when the coil device is mounted on the circuit board, a connection member, such as solder, also enters the recess, a fillet is also formed on the outer surface of the inner rising piece, and the joint strength between the circuit board and the terminal electrodes is improved.

Each of the terminal electrodes is composed of, for example, a metal terminal, and each attachment piece, which is a main part of each terminal electrode, can be attached to the outer end surface of the flange portion. Moreover, the inner rising piece of each terminal electrode only loosely enters the recess, and the wall surface of the recess and the inner rising piece are not engaged with each other. Thus, even if the coil device is exposed to an environment where the temperature changes severely, for example, from −40° C. to 150° C., the thermal stress acting on the terminal electrodes is unlikely to act on the flange portion of the magnetic core, and the magnetic core is less likely to have cracks. Moreover, even in a severe temperature environment, the joint strength between the coil device and the circuit board does not deteriorate very much.

Preferably, a clearance having a predetermined space is formed between a side wall connecting to a bottom wall of the recess and a tip of the inner rising piece entering the recess. In this structure, even if the coil device is exposed to an environment where the temperature changes severely, the thermal stress acting on the terminal electrodes is unlikely to act on the flange portion of the magnetic core, and the magnetic core is less likely to have cracks. Moreover, even in a severe temperature environment, the joint strength between the coil device and the circuit board does not deteriorate very much.

Preferably, the first terminal electrode or the second terminal electrode further includes an outer rising piece rising from an edge of the first attachment piece or the second attachment piece toward a side surface of the flange portion. A fillet of the connection member, such as solder, is easily formed on the outer surface of the outer rising piece. Thus, the joint strength between the terminal electrode and the circuit board is further improved.

The first terminal electrode or the second terminal electrode may include a pair of separate attachment pieces connecting to the first wire-joint portion and the second wire-joint portion, respectively, and the separate attachment pieces may be connected by the outer rising piece. The first wire-joint portion and the second wire-joint portion of the first terminal electrode or the second terminal electrode may be connected by the first attachment piece or the second attachment piece.

BRIEF DESCRIPTION OF THE DRAWING(S)

DETAILED DESCRIPTION OF THE INVENTION

Hereinafter, the present invention is explained based on embodiments shown in the figures.

A coil device 2 according to an embodiment of the present invention shown in FIG. 1A to FIG. 1E is used as, for example, parts of DC-DC converter and is particularly preferably used as a power inductor.

Figure 2A:
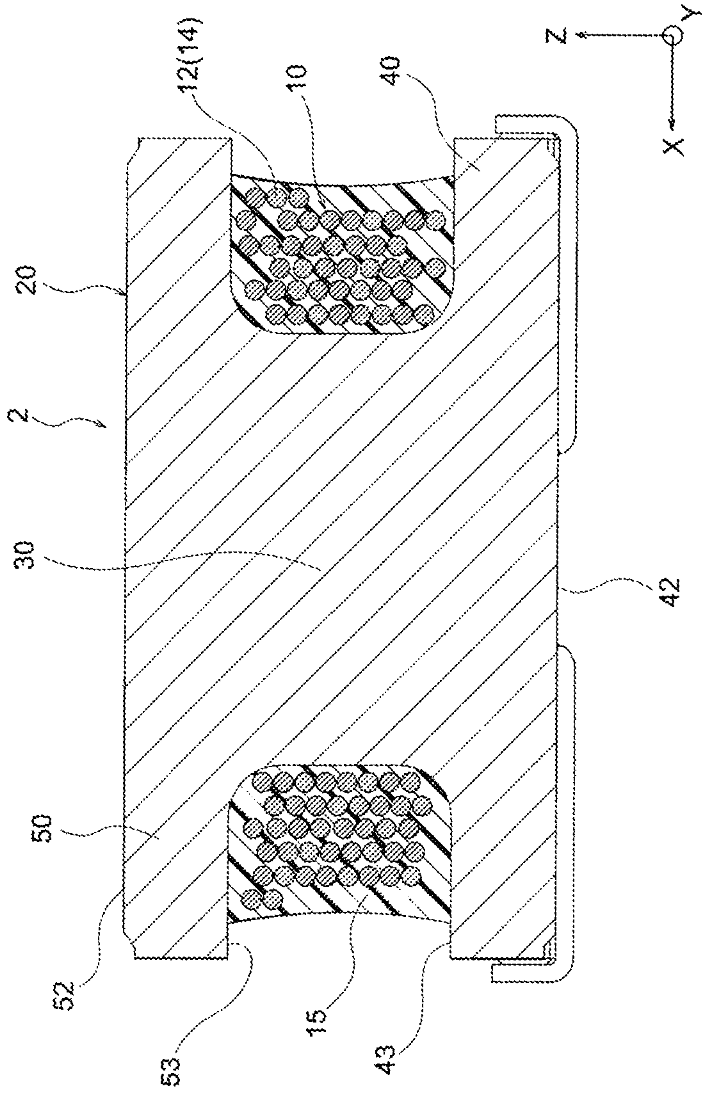
FIG. 2A is a schematic cross-sectional view along the IIA-IIA line shown in FIG. 1A.

The coil device 2 includes a drum core 20 as a magnetic core. Examples of the magnetic material constituting the drum core 20 include soft magnetic materials such as metal and ferrite, but the magnetic material is not limited. As shown in FIG. 2A, the drum core 20 includes a winding core portion 30 wound by two wires (a first wire 12 and a second wire 14) constituting a coil portion 10 in the winding axis of the core 20.

Preferably, the winding core portion 30 wound by the wires 12 and 14 is covered with an exterior resin 15. This makes it possible to effectively protect the coil portion 10 and prevent short circuit defects. The exterior resin 15 may be made of a resin containing a magnetic material. In this configuration, the exterior resin 15 containing a magnetic material becomes a magnetic field path, and magnetic characteristics of the coil device 2 are improved. The magnetic material contained in the exterior resin 15 is not limited and is, for example, a magnetic powder similar to that constituting the core 20 or other magnetic powders.

The wires 12 and 14 are not limited and can be, for example, a conductive core wire made of copper or the like (e.g., flat wire, round wire, stranded wire, litz wire, braided wire), a wire covered with these conductive core wires in an insulating manner, or the like. Specifically, known windings, such as polyimide wire (AIW), polyurethane wire (UEW), UEW, and USTC, can be used. The wire 12 (14) have any diameter, such as 0.1-0.5 mm. The wires 12 and 14 may have different diameters and materials, but preferably have the same diameter and material.

A first flange portion 40 and a second flange portion 50 are formed integrally at both ends of the winding core portion 30 in the winding axis (Z-axis). The first flange portion 40 and the second flange portion 50 protrude from the winding core portion 30 in the X-Y axes plane. The X-axis, the Y-axis, and the Z-axis are perpendicular to each other. The Z-axis corresponds with the winding axis.

The winding core portion 30 has any cross section (cross section of the X-Y axes plane), such as square cross section, oblong cross section, circular cross section, and other cross sections, and has a substantially circular cross section in the present embodiment.

As shown in FIG. 2A, the second flange portion 50 includes an outer end surface 52 in the winding axis (Z-axis) and an inner surface 53 opposite to the outer end surface 52 in the winding axis. The upper end of the coil portion 10 in the Z-axis is located on the inner surface 53. Likewise, the first flange portion 40 includes an outer end surface 42 in the winding axis and an inner surface 43 opposite to the outer end surface 42 in the winding axis. The lower end of the coil portion 10 in the Z-axis is located on the inner surface 43 in the winding axis. The number of winding layers of wire 12 (14) is not limited. The wire 12 (14) is wound in any manner.

Figure 1A:
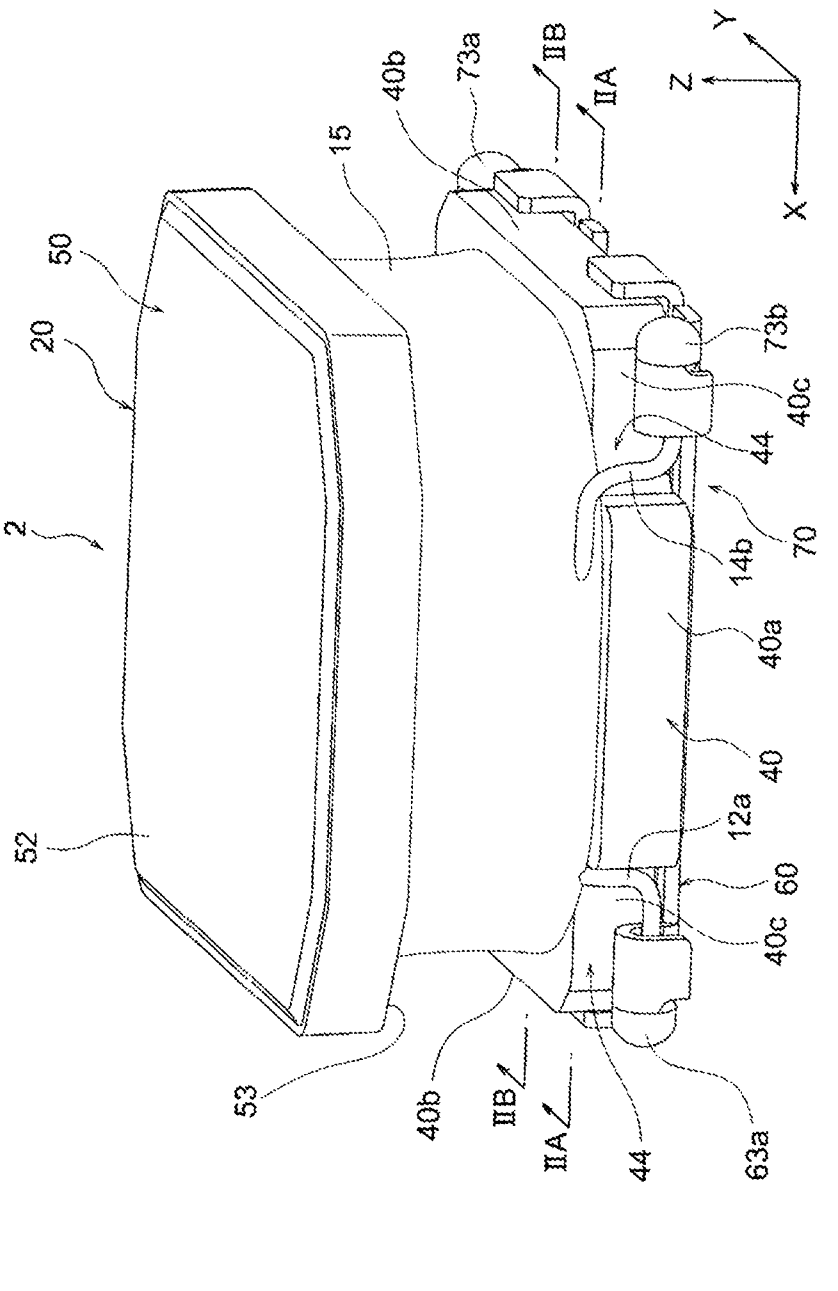
FIG. 1A is a perspective view of a coil device according to an embodiment of the present invention.
Figure 1B:
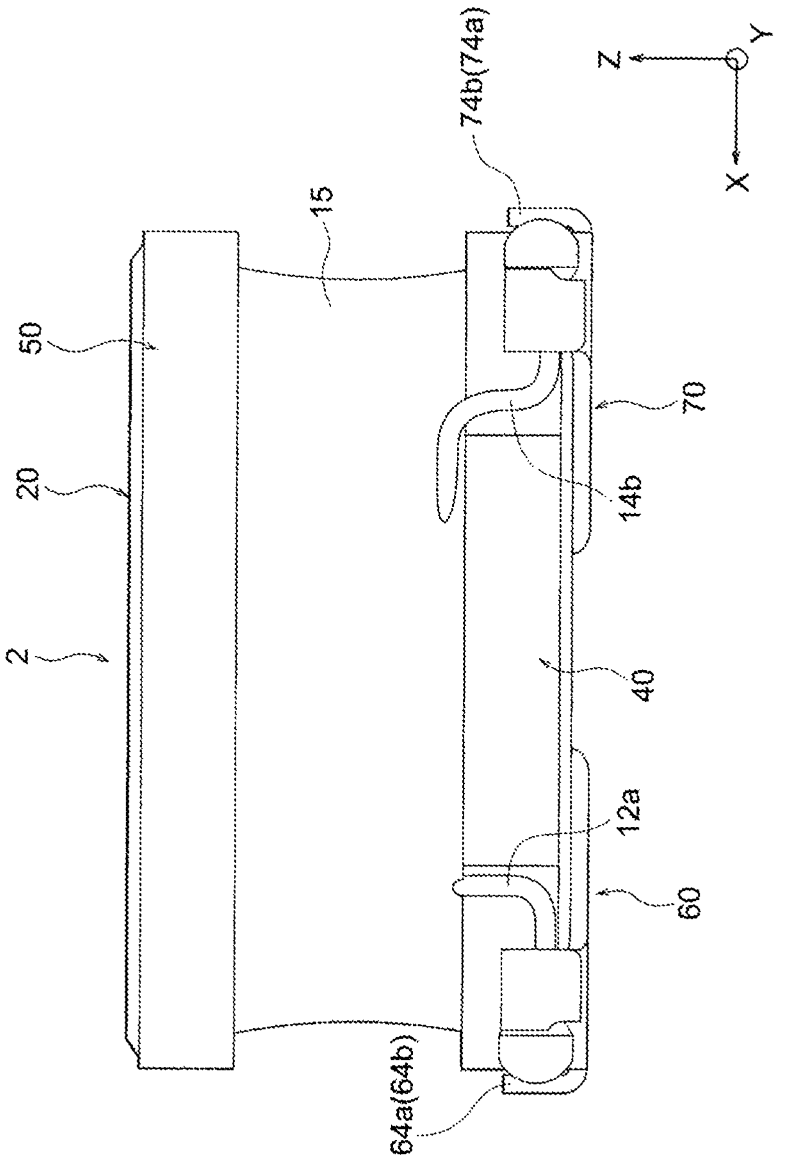
FIG. 1B is a front view of the coil device shown in FIG. 1A.
Figure 1C:
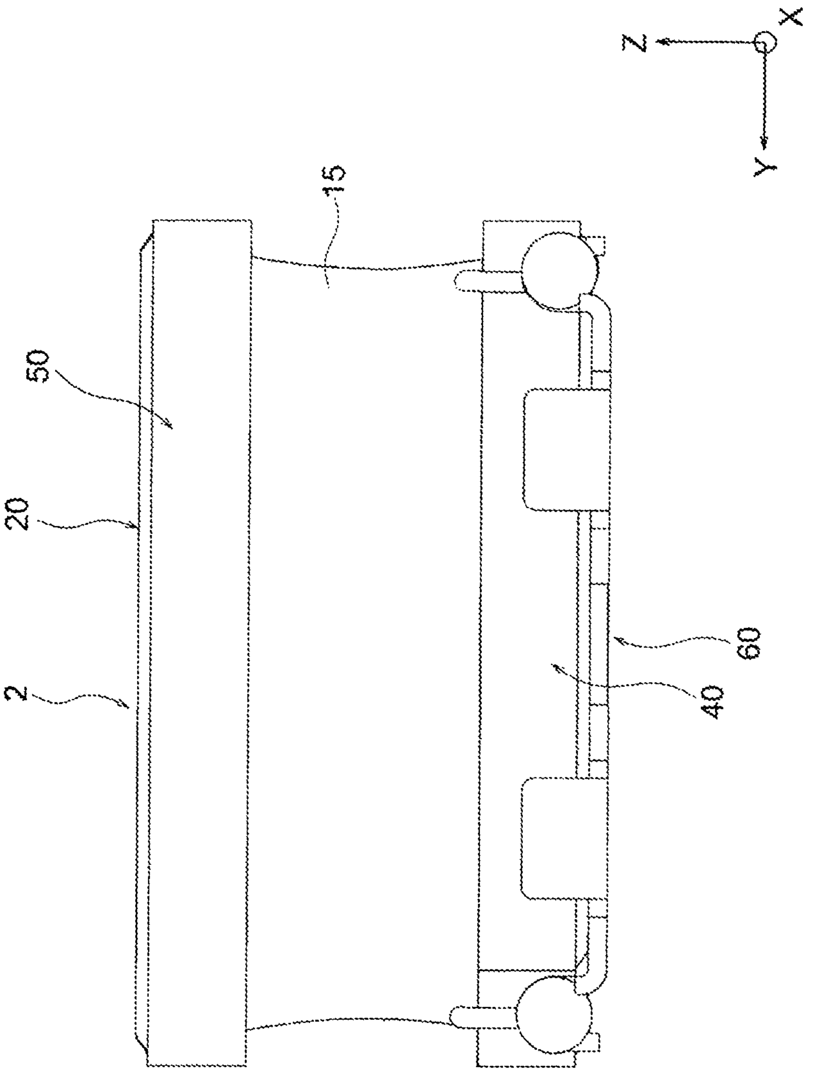
FIG. 1C is a right side view of the coil device shown in FIG. 1A (the left side view is symmetrical to the right side view)
Figure 1D:
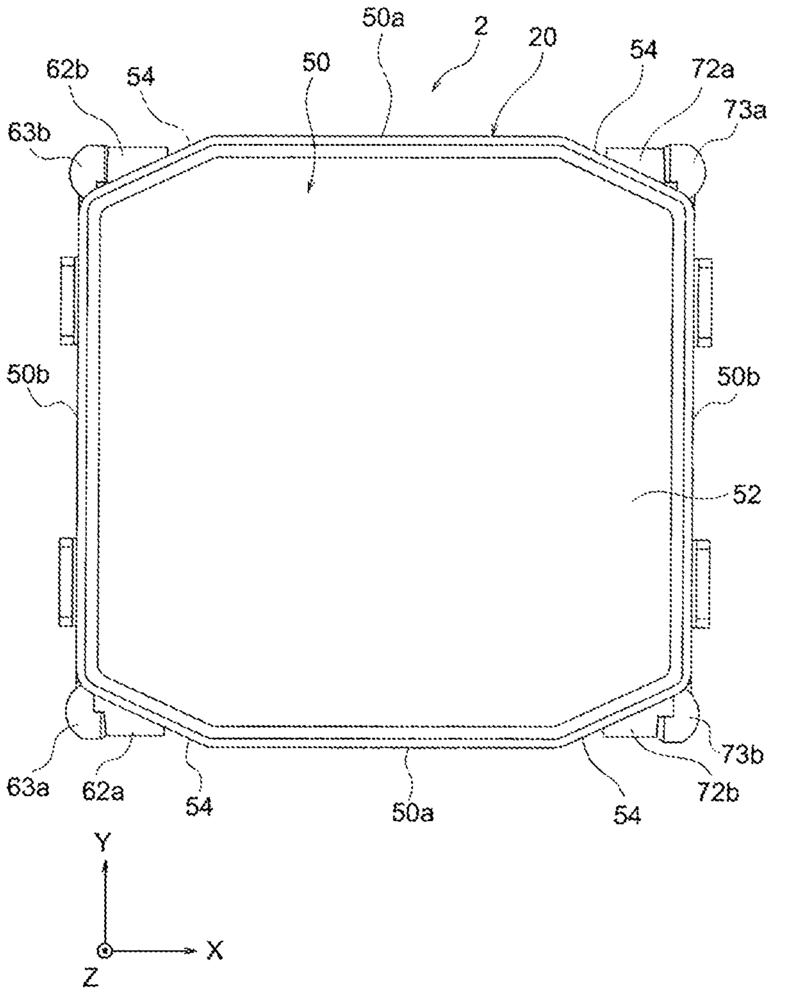
FIG. 1D is a plane view of the coil device shown in FIG. 1A.

The second flange portion 50 has any specific shape. In the present embodiment, as shown in FIG. 1D, the second flange portion 50 includes side surfaces 50*a* and 50*a* facing each other in the Y-axis and side surfaces 50*b* and 50*b* facing each other in the X-axis and has a rectangular shape as a whole when viewed from the Z-axis. Then, chamfered portions 54 are formed at four corners where virtual both-side extended surfaces of the side surfaces 50*a* and 50*a* of the second flange portion 50 and virtual both-side extended surfaces of the side surfaces 50*b* and 50*b* of the second flange portion 50 intersect. The chamfered portions 54 are formed integrally with the first flange portion 40, the second flange portion 50, and the winding core portion 30 at the time of forming the drum core 20 shown in FIG. 3A, but may be formed by cutting, polishing, or the like after the integral formation.

Figure 5A:
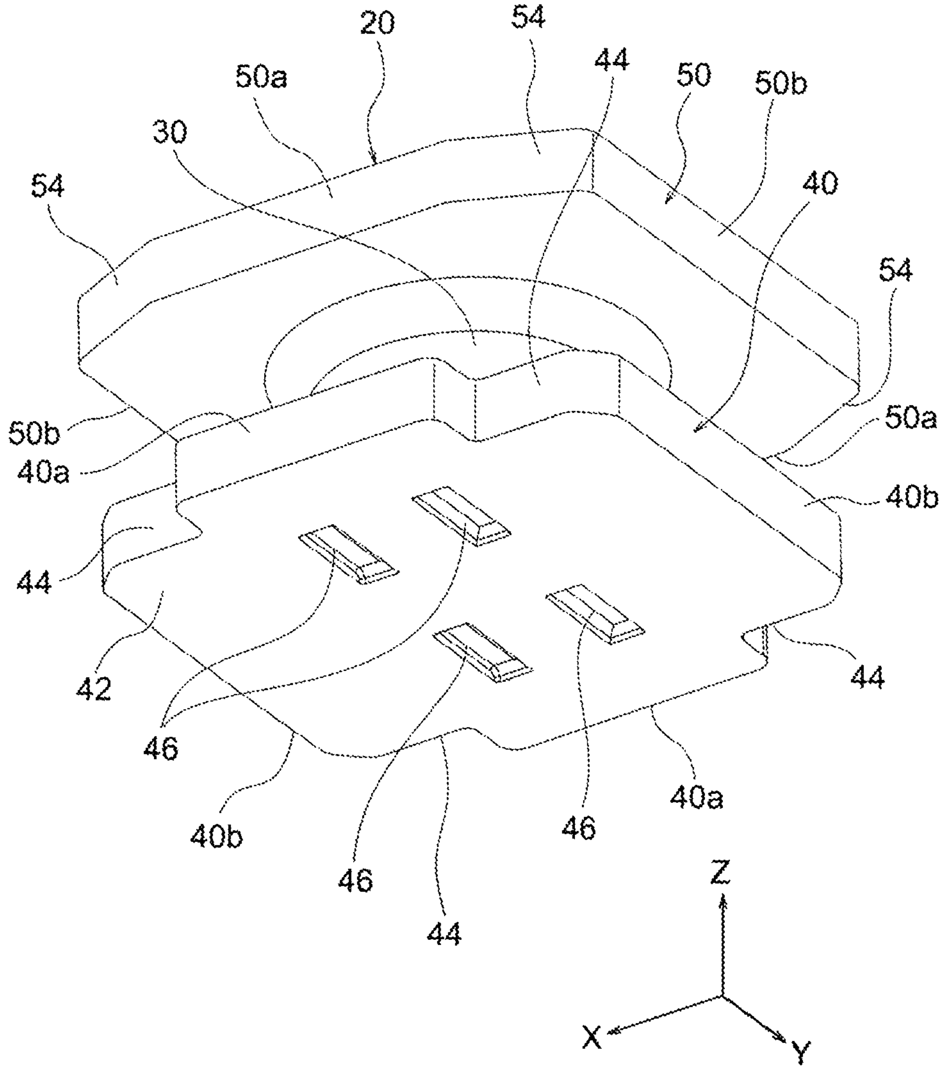
FIG. 5A is a bottom view of only the drum core shown in FIG. 1E viewed from its bottom surface side.

The first flange portion 40 also has any specific shape. In the present embodiment, as shown in FIG. 5A, the first flange portion 40 includes side surfaces 40*a* and 40*a* facing each other in the Y-axis and side surfaces 40*b* and 40*b* facing each other in the X-axis and has a rectangular shape as a whole when viewed from the Z-axis. Then, notches 44 are formed at four corners where virtual both-side extended surfaces of the side surfaces 40*a* and 40*a* of the first flange portion 40 and virtual both-side extended surfaces of the side surfaces 40*b* and 40*b* of the first flange portion 40 intersect. The notches 44 are formed integrally with the first flange portion 40, the second flange portion 50, and the winding core portion 30 at the time of forming the drum core 20, but may be formed by cutting, polishing, or the like after the integral formation.

In the present embodiment, as shown in FIG. 5A, the side surface 40*a* (40*a*) of the first flange portion 40 and the side surface 50*a* (50*a*) of the second flange portion 50 are located on the same virtual plane (X-Z plane) so as to be flush with each other, and the side surface 40*b* (40*b*) of the first flange portion 40 and the side surface 50*b* (50*b*) of the second flange portion 50 are located on the same virtual plane (Y-Z plane) so as to be flush with each other.

Moreover, in the present embodiment, the size of each notch 44 of the first flange portion 40 is larger than that of each chamfered portion 54 of the second flange portion 50, and the exterior shape of the first flange portion 40 located on the lower side in the Z-axis is invisible when the outer end surface 52 of the second flange portion 50 is viewed from the upper side in the Z-axis as shown in FIG. 1D. However, wire-joint portions 63 and 73 shown in FIG. 1A are partly visible at a corresponding point to each chamfered portion 54 of the second flange portion 50.

That is, in the present embodiment, the exterior size of the second flange portion 50 and the exterior size of the first flange portion 40 are substantially the same, but since the first flange portion 40 is provided with the notches 44, which are larger than the chamfered portions 54, the volume of the second flange portion 50 and the volume of the first flange portion 40 are different from each other if they have the same thickness. In order that the second flange portion 50 and the first flange portion 40 have substantially the same volume, the first flange portion 40 may be thicker than the second flange portion 50 in the Z-axis.

As shown in FIG. 5A, four independent recesses 46 are arranged on the outer end surface 42 of the first flange portion 40 so as to be close to the center of the outer end surface 42 as much as possible, and two of the four independent recesses 46 are arranged at a predetermined space in each of the X-axis and the Y-axis. Each of the independent recesses 46 is formed long in the Y-axis, and the space between the independent recesses 46 next to each other in the X-axis or the Y-axis is determined so that terminal electrodes next to each other in the X-axis shown in FIG. 3A (a first terminal electrode 60 and a second terminal electrode 70) are insulated from each other.

Figure 3A:
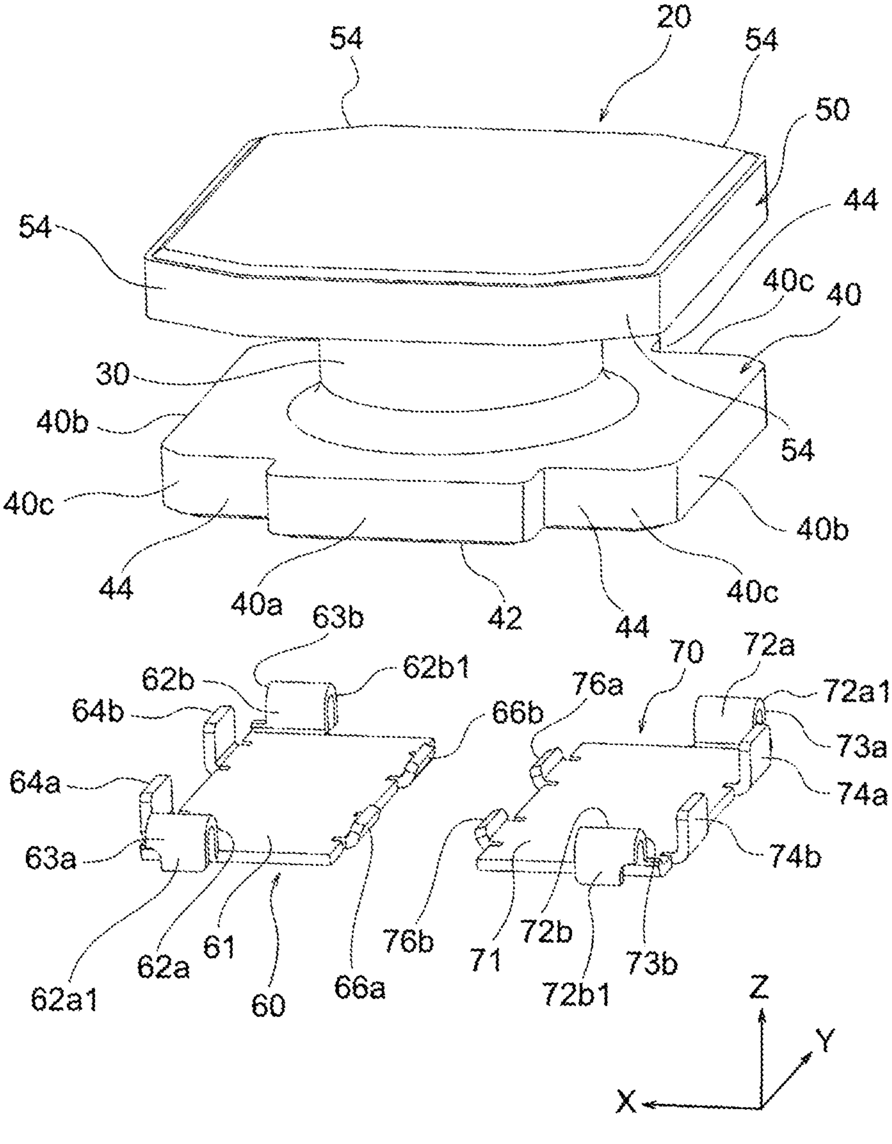
FIG. 3A is an exploded perspective view illustrating a drum core and terminal electrodes shown in FIG. 1A.

In the present embodiment, as shown in FIG. 3A, a pair of terminal electrodes 60 and 70 is attached to the outer end surface 42 of the first flange portion 40 in the winding axis. The details of the terminal electrodes 60 and 70 are explained below, but the terminal electrodes 60 and 70 may be made of, for example, a conductive metal plate of tough pitch steel, phosphor bronze, brass, iron, nickel, etc.

Figure 1E:
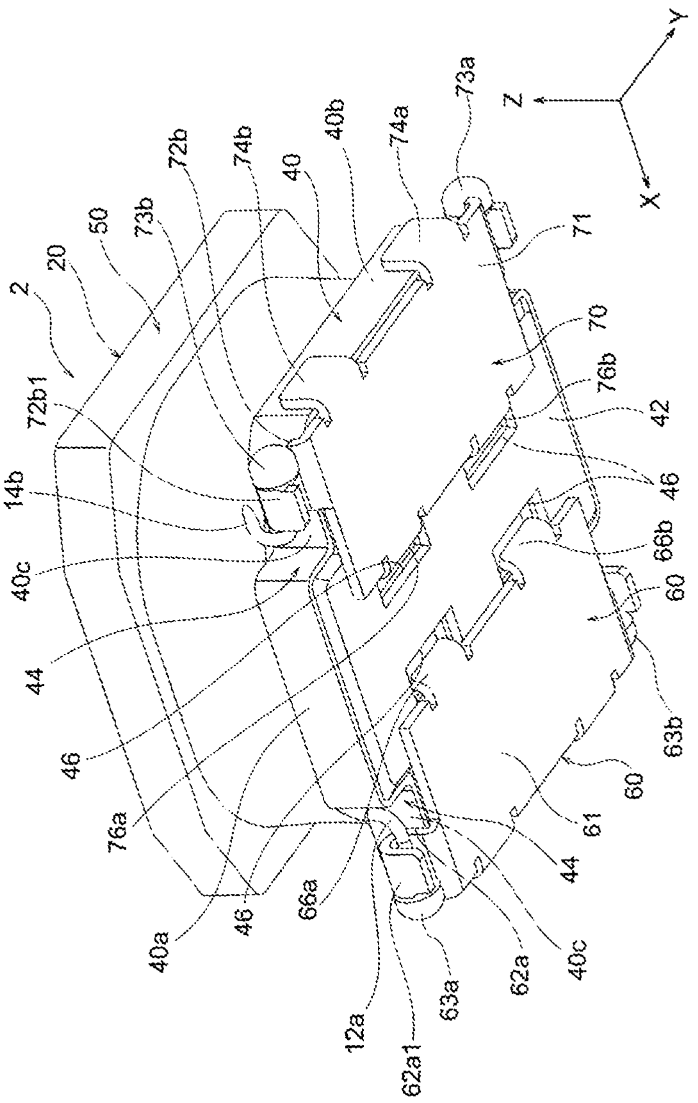
FIG. 1E is a perspective view viewed from the bottom surface side of the coil device shown in FIG. 1A.

The terminal electrode 60 (70) includes a plate-shaped attachment piece 61 (71) having a plane substantially parallel to a plane including the X-axis and the Y-axis. As shown in FIG. 1E, the attachment pieces 61 and 71 are attached to the outer end surface 42 of the first flange portion 40 in the winding axis by adhesive or so. A terminal attachment groove fitted to the shape of the attachment piece 61 (71) may be formed on the outer end surface 42 of the first flange portion 40 adhering to the attachment piece.

Preferably, the depth of each terminal attachment groove is smaller than the thickness of each attachment piece. Preferably, the bottom surface of the attachment piece 61 (71) protrudes from the outer end surface 42 in the winding axis. This facilitates a mounting operation at the time of connecting the attachment pieces 61 and 71 of the coil device 2 to a wiring pattern 82 of a circuit board 82 shown in FIG. 2B by a connection member, such as a solder 84.

As shown in FIG. 3A, a first wire joint rising piece 62*a* and a second wire-joint rising piece 62*b* are integrally formed at both ends of the attachment piece 61 in the Y-axis near the outside in the X-axis so as to rise in the Z-axis, and a first wire-joint rising piece 72*a* and a second wire-joint rising piece 72*b* are integrally formed at both ends of the attachment piece 71 in the Y-axis near the outside in the X-axis so as to rise in the Z-axis.

The first wire-joint rising piece 62*a* and the first wire-joint rising piece 72*a* are arranged diagonally in the first flange portion 40 across the winding core portion 30. Likewise, the second wire-joint rising piece 62*b* and the second wire-joint rising piece 72*b* are arranged diagonally in the first flange portion 40 across the winding core portion 30.

The wire-joint rising piece 62*a* (62*b*, 72*a*, 72*b*) can contact with a notch side surface 40*c* of each notch 44 of the first flange portion 40. Each notch side surface 40*c* is a surface recessed from each side surface 40*a* toward the inner side of each notch 44 in the Y-axis and being substantially parallel to each side surface 40*a*.

Figure 4:
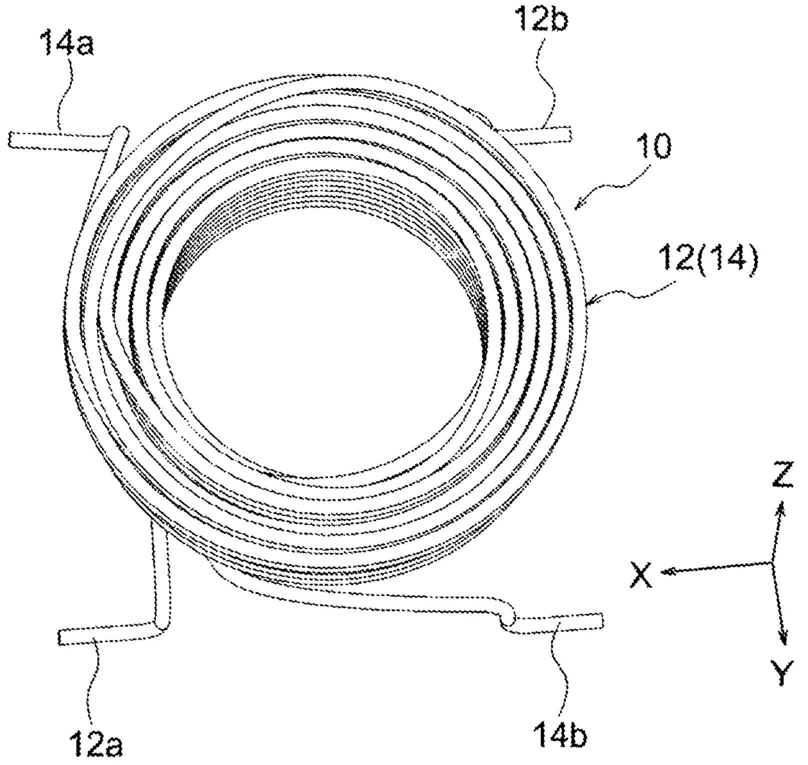
FIG. 4 is a perspective view of only the coil portion shown in FIG. 2A.

The tip of the wire-joint rising piece 62*a* (62*b*, 72*a*, 72*b*) is bent to turn back and forms a hold piece 62*a*1 (62*b*1, 72*a*1, 72*b*1). A first leading portion (first end) 12*a* of the first wire 12 shown in FIG. 4 is sandwiched and joined between the hold piece 62*a*1 and the wire joint rising piece 62*a* so as to form a first wire-joint portion 63*a* shown in FIG. 1A. In the first wire-joint portion 63*a*, the first leading portion 12*a* and the rising piece 62*a* of the first terminal electrode 60 are connected electrically.

A first leading portion (first end) 14*a* of the second wire 14 shown in FIG. 4 is sandwiched and joined between the hold piece 62*b*1 and the wire-joint rising piece 62*b* shown in FIG. 3A so as to form a second wire-joint portion 63*b* shown in FIG. 1D. In the second wire-joint portion 63*b*, the first leading portion 14*a* and the rising piece 62*b* of the first terminal electrode 60 are connected electrically.

A second leading portion (second end) 12*b* of the first wire 12 shown in FIG. 4 is sandwiched and joined between the hold piece 72*a*1 and the wire-joint rising piece 72*a* shown in FIG. 3A so as to form a first wire joint portion 73*a* shown in FIG. 1D. In the first wire-joint portion 73*a*, the second leading portion 12*b* and the rising piece 72*a* of the second terminal electrode 70 are connected electrically.

A second leading portion (second end) 14*b* of the second wire 14 shown in FIG. 4 is sandwiched and joined between the hold piece 72*b*1 and the wire-joint rising piece 72*b* shown in FIG. 3A so as to form a second wire-joint portion 73*b* shown in FIG. 1D. In the second wire-joint portion 73*b*, the second leading portion 12*b* and the rising piece 72*b* of the second terminal electrode 70 are connected electrically.

Preferably, the wire-joint portions 63*a*, 63*b*, 73*a*, and 73*b* are formed by laser welding. The laser beam for welding is, for example, emitted from below the flange portion 40 in the Z-axis so as to weld the tips of the leading portions 12*a*, 12*b*, 14*a*, and 14*b* to the wire-joint rising pieces 62*a*, 62*b*, 72*a*, and 72*b*, respectively. As a result, the wire-joint portions 63*a*, 63*b*, 73*a*, and 73*b* are formed.

The wire-joint rising pieces 62*a*, 62*b*, 72*a*, and 72*b* for attaching the leading portions 12*a*, 12*b*, 14*a*, and 14*b* shown in FIG. 4, respectively, are arranged inside the notches 44 of the first flange portion 40 shown in FIG. 5A. Moreover, as shown in FIG. 1D, the wire-joint rising pieces 62*a*, 62*b*, 72*a*, and 72*b* for forming the wire-joint portions 63*a*, 63*b*, 73*a*, and 73*b*, respectively, are partly arranged outside the chamfered portions 54 of the second flange portion 50. Thus, the laser beam emitted from below the flange portion 40 in the Z-axis is not irradiated to either of the flange portions 40 and 50, and the wire-joint portions 63*a*, 63*b*, 73*a*, and 73*b* can be formed.

As shown in FIG. 3A, a pair of outer rising pieces 64*a* and 64*b* and a pair of outer rising pieces 74*a* and 74*b* are formed integrally with the outer ends of the attachment pieces 61 and 71 in the X-axis, respectively, so as to rise in the Z-axis. The height of the outer rising piece 64*a* (64*b*, 74*a*, 74*b*) is similar to that of the wire-joint rising piece 62*a* (62*b*, 72*a*, 72*b*).

Moreover, a pair of inner rising pieces 66*a* and 66*b* and a pair of inner rising pieces 76*a* and 76*b* are formed integrally with the inner ends of the attachment pieces 61 and 71 in the X-axis, respectively, so as to rise in the Z-axis. The height of the inner rising piece 66*a* (66*b*, 77*a*, 77*b*) is smaller than that of the wire-joint rising piece 64*a* (64*b*, 74*a*, 74*b*).

Figure 2B:
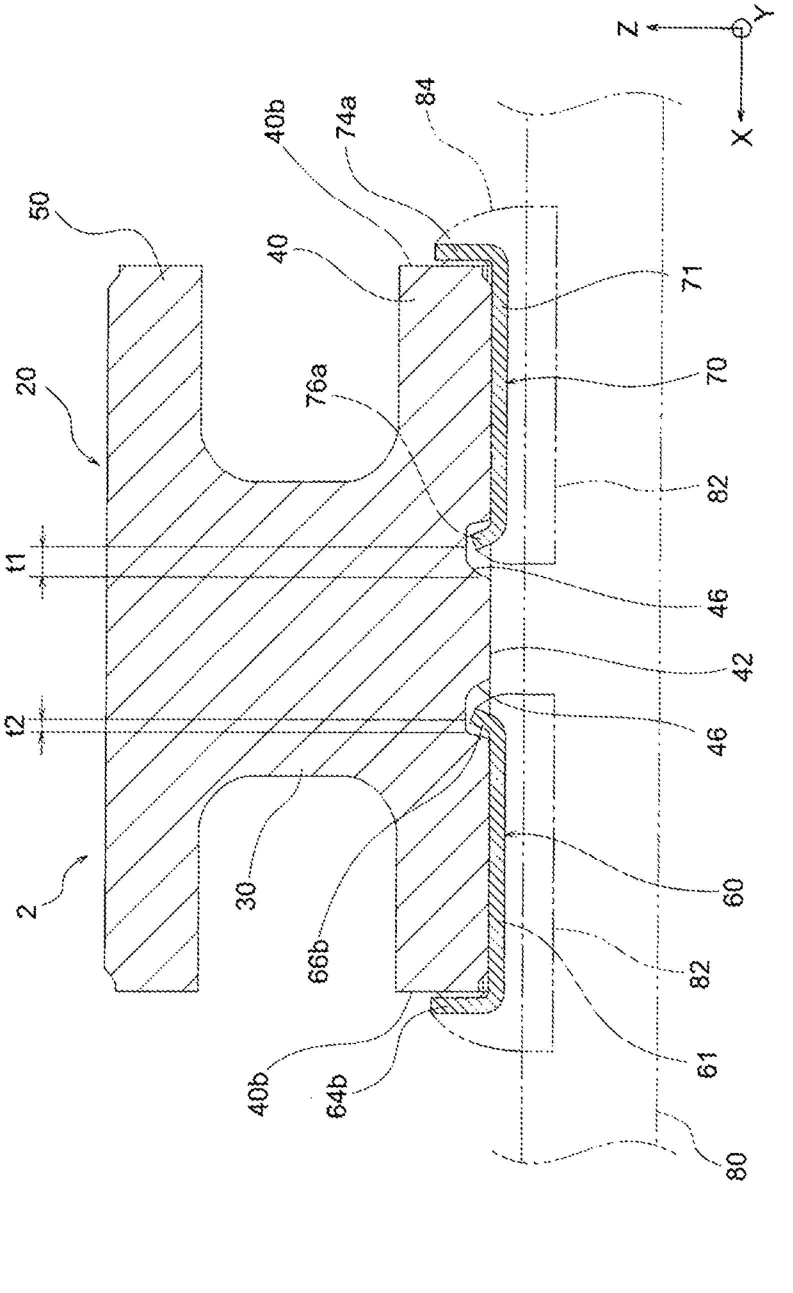
FIG. 2B is a schematic cross-sectional view along the IIB-IIB line shown in FIG. 1A and does not illustrate a coil portion or an exterior resin.

As with the wire-joint rising piece 62*a* (62*b*, 72*a*, 72*b*), the angle of the outer rising piece 64*a* (64*b*, 74*a*, 74*b*) to the attachment piece 61 (71) is preferably about 90 degrees, but the angle of the inner rising piece 66*a* (66*b*, 77*a*, 77*b*) is preferably larger than 90 degrees and is preferably 95-160 degrees, more preferably 100-150 degrees, as shown in FIG. 2B.

As shown in FIG. 2B, preferably, the outer rising pieces 64*b* and 74*a* (64*a* and 74*b*) contact with the side surfaces 40*b* of the first flange portion 40 so as to position the terminal electrodes 60 in the X-axis with respect to the outer end surface 42 of the first flange portion 40. As shown in FIG. 1E, preferably, the wire-joint rising piece 62*a* (62*b*, 72*a*, 72*b*) is in contact with the notch side surface 40*c* in the notch 44 of the first flange portion 40. This is because the terminal electrode 60 (70) is positioned in the Y-axis with respect to the outer end surface 42 of the first flange portion 40.

As shown in FIG. 2B, the inner rising pieces 66*a*, 66*b*, 77*a*, and 77*b* loosely enter the independent recesses 46 formed on the outer end surface of the first flange portion 40. That is, each of the inner rising pieces 66*a*, 66*b*, 77*a*, and 77*b* is preferably away from the inner wall surface of each independent recess 46 at a predetermined space (predetermined gap) t1 in the X-axis and is preferably away from the outer wall surface of each independent recess 46 at a predetermined space (predetermined gap) t2 in the X-axis. Moreover, preferably, the tips of the inner rising pieces 66 and 76 do not contact with the bottom wall surfaces of the independent recesses 46.

Although not limited, the predetermined space t1 is preferably about 1.5 to 5 times as large as the plate thickness of the inner rising piece 66 (76), and the predetermined space t2 is preferably about 0.1 to 3 times as large as the plate thickness of the inner rising piece 66 (76). The width of each independent recess 46 in the Y-axis shown in FIG. 5A is larger than that of the inner rising piece 66*a* (66*b*, 77*a*, 77*b*) in the Y-axis shown in FIG. 3A and is preferably about 1.1 to 1.5 times as large as that of the inner rising piece 66*a* (66*b*, 77*a*, 77*b*) in the Y-axis shown in FIG. 3A.

In the present specification, the "outer side" means the side located away from the center of the coil device 2, and the "inner side" means the side near the center of the coil device 2.

Next, a method of manufacturing the coil device 2 shown in FIG. 1A to FIG. 5A is explained. First, the drum core 20 shown in FIG. 3A and FIG. 5A is formed. The drum core 20 is formed by any method, such as compression molding, ceramic injection molding (CIM), and metal injection molding (MIM), and thereafter fired to be a sintered body.

Next, the terminal electrodes 60 and 70 are attached to the outer end surface 42 of the first flange portion 40 of the drum core 20. When the terminal electrodes 60 and 70 are attached and fixed to the outer end surface 42, an adhesive exists only between the attachment piece 61 (71) and the outer end surface 42. Then, it is preferable to pay attention so as not to put the adhesive into the independent recesses 46 and protrude the adhesive toward the side surfaces 40*a*, 40*b*, and 40*c* on the outer side of the first flange portion 40.

The terminal electrode 60 (70) can be easily formed by punching and bending a sheet of metal plate (e.g., copper plate). After or before the terminal electrode 60 (70) is attached to the drum core, the wires 12 and 14 shown in FIG. 4 are wound around the core portion 30 of the drum core 20 shown in FIG. 5 to form the coil portion 10. When the wires 12 and 14 are wound around the winding core portion 30, the wires 12 and 14 may be wound separately or may be wound simultaneously in the same direction.

In the state where the coil portion 10 is formed around the winding core portion 30, the leading portions 12*a* and 12*b* (14*a* and 14*b*), which are both ends of the wire 12 (14) constituting the coil portion 10, are located and temporarily fixed between the wire-joint rising piece 62*a* and 72*a* (62*b* and 72*b*) and the hold pieces 62*a*1 and 72*a*1 (62*b*1 and 72*b*1) of the terminal electrode 60. In this state, a laser welding is performed.

As mentioned above, the laser beam emitted from below the flange portion 40 in the Z-axis is not irradiated to either of the flange portions 40 and 50, and the wire-joint portions 63*a*, 63*b*, 73*a*, and 73*b* can be formed. The leading portions 12*a* and 12*b* (14*a* and 14*b*) of the winding wire 12 (14) and the terminal electrode 60 (70) are connected at a temperature higher than that for forming the solder fillet (230-280° C.), such as laser welding (a temperature of 1000° C. or higher). Thus, the wire 12 (14) can be jointed firmly and reliably.

In the coil device 2 according to the present embodiment, as shown in FIG. 1E, two terminal electrodes 60 and 70 are attached to the outer end surface 42 of the first flange portion 40 of the drum core 20 as a magnetic core. Thus, at least two wires 12 and 14 are wound around the winding core portion 30 of the coil device 2 according to the present embodiment, the leading portions 12*a* and 12*b* (both ends of the wire 12) are connected to the two terminal electrodes 60 and 70, respectively, and the leading portions 14*a* and 14*b* (both ends of the wire 14) are connected to the two terminal electrodes 60 and 70, respectively.

Thus, in the coil device 2 according to the present embodiment, the electric current between the first terminal electrode 60 and the second terminal electrode 70 separately flows through at least a coil consisting of the first wire 12 and a coil consisting of the second wire 14. Thus, it is possible to reduce the electric current flowing through the single first wire 12 or second wire 14 and increase the total electric current flowing between the first terminal electrode 60 and the second terminal electrode 70. Thus, it is possible to achieve the coil device 2 applicable for a large electric current even without using a thick wire.

Since it is not necessary to use a thick wire, the leading portions 12*a*, 12*b*, 14*a*, and 14*b* of the wires 12 and 14 are easily bent, the wire joint operation is facilitated, and the reliability of the joint strength between the wires 12 and 14 and the terminal electrodes 60 and 70 at the wire-joint portions is also improved. Moreover, since it is not necessary to use a thick wire, it is not accordingly necessary to increase the thickness of the flange portions 40 and 50 of the magnetic core 20, and the coil device 2 can also be downsized in this respect.

Moreover, since the first wire-joint portion 63*a* (73*a*) and the second wire-joint portion 63*b* (73*b*) of the terminal electrode 60 (70) are arranged away from each other, the wires 12 and 14 and the terminal electrodes 60 and 70 at the wire-joint portions 63*a*, 63*b*, 73*a*, and 73*b* are easily separately connected by, for example, laser welding. The thermal influence of the connection operation at any of the wire-joint portions 63*a*, 63*b*, 73*a*, and 73*b* is less likely to adversely affect the other wire-joint portions, and the connection reliability at the wire-joint portions 63*a*, 63*b*, 73*a*, and 73*b* is improved.

In the coil device 2 according to the present embodiment, four independent recesses 46 are formed on the outer end surface 42 of the first flange portion 40 of the drum core 20, and the inner rising pieces 66*a*, 66*b*, 77*a*, and 77*b* of the terminal electrodes 60 and 70 loosely enter the recesses 46. Thus, as shown in FIG. 2B, when the coil device 2 is mounted on the circuit board 80, a connection member, such as the solder 84, also enters the recesses 46, a fillet is also formed on the outer surfaces of the inner rising pieces 66 and 76, and the joint strength between a wiring pattern 82 of the circuit board 80 and the terminal electrodes 60 and 70 is improved.

The terminal electrode 60 (70) is composed of, for example, a metal terminal, and the attachment portion 61 (71), which is a main part of the terminal electrode 60 (70), is attached to the outer end surface 42 of the flange portion 40. Moreover, the inner rising pieces 66*a*, 66*b*, 77*a*, and 77*b* of the terminal electrodes 60 and 70 only loosely enter the recesses 46, and the wall surfaces of the recesses 46 and the inner rising pieces 66 and 76 are not engaged with each other. Thus, even if the coil device 2 is exposed to an environment where the temperature changes severely, for example, from −40° C. to 150° C., the thermal stress acting on the terminal electrode 60 is unlikely to act on the flange portion 40 of the drum core 20, and the drum core 20 is less likely to have cracks. Moreover, even in a severe temperature environment, the joint strength between the coil device 2 and the circuit board 80 does not deteriorate very much.

In the present embodiment, the outer rising pieces 64*a*, 64*b*, 74*a*, and 74*b* are formed integrally with the edges of the attachment portions 61 and 71 located opposite to the inner rising pieces 66*a*, 66*b*, 76*a*, and 76*b* in the X-axis and stand integrally along the side surface 40*b* of the flange portion 40. As shown in FIG. 2B, a fillet of the solder 84, is easily formed on the outer surfaces of the rising pieces 66*b* and 76*a* (66*a* and 76*b*). Thus, the joint strength between the terminal electrodes 60 and 70 and the circuit board 80 is further improved.

When the coil device 2 is mounted on, for example, the circuit board 80, the solder 84 attached on the lower surfaces of the terminals 60 and 70 is also attached to the outer surfaces of the outer rising pieces 64*b* and 74*a* (64*a* and 74*b*). When viewed from the above side in the Z-axis direction, the adhesion state of the solder 84 can be confirmed without being hidden by the second flange portion 50.

In the present embodiment, the height of the outer rising pieces 64*b* and 74*a* (64*a* and 74*b*) is smaller than the thickness of the first flange portion 40 in the winding axis. In this structure, the coil device 2 can be compact. In addition, the exterior resin 15 shown in FIG. 1B is less likely to attach to the outer rising pieces 64*a* and 74*b* (64*b* and 74*a*), and a fillet formation at the time of mounting is not hindered.

In the present embodiment, as shown in FIG. 1E, the inner rising pieces 66*a*, 66*b*, 76*a*, and 76*b* are arranged in an offset manner compared with the outer rising pieces 64 and 74 so as to be close to the central axis of the winding core portion 30 (see FIG. 2B) when viewed from the X-axis. Since the inner rising pieces 66*a*, 66*b*, 76*a*, and 76*b* are arranged in such a manner, the positions of the recesses 46 formed on the outer end surface 42 of the flange portion 40 can be close to the center of the outer end surface 42. As a result, the formation positions of the recesses 46 correspond with the position of the winding core portion 30 (see FIG. 2B), the strength of the drum core 20 is less likely to decrease even with the recesses 46 formed on the flange portion 40, the recesses 46 can be formed without increasing the thickness of the flange portion 40, and the compactness of the coil device 2 is achieved.

In the present embodiment, as shown in FIG. 3A, the wire-joint rising pieces 62*a*, 62*b*, 72*a*, and 72*b* different from the inner rising pieces and the outer rising pieces are formed integrally with the attachment portions 61 and 71. The wire joint rising pieces 62*a*, 62*b*, 72*a*, and 72*b* rise integrally along the notch side surfaces 40*c* parallel to the side surfaces 40*a* of the flange portion 40. The leading portions 12*a* and 14*a* of the wires are connected to the wire joint rising pieces 62*a* and 62*b*, respectively. The leading portions 12*b* and 14*b* of the wires are connected to the wire joint rising pieces 72*a* and 72*b*, respectively.

In this structure, the terminal electrode 60 (70) includes six rising pieces 62*a*, 62*b*, 64*a*, 64*b*, 66*a*, and 66*b* (72*a*, 72*b*, 74*a*, 74*b*, 76*a*, and 76*b*). These rising pieces rise on the side surfaces 40*b* and 40*c* of the flange portion 40 or inside the recesses 46 at different positions from the attachment portions 61 and 71, and as shown in FIG. 2B, the number of fillets of the solder 84 with the circuit board 80 increases. Thus, the connection strength with the circuit board 80 is further improved.

In the present embodiment, the flange portion 40 protrudes outward in the radial direction of the winding core portion 30 and has a substantially rectangular shape as a whole when viewed from the Z-axis, and the notch 44 for disposing the connection part between the wire-joint rising piece 62*a* (62*b*, 72*a*, 72*b*) and the leading portion 12*a* (12*b*, 14*a*, 14*b*) is formed at each of four corners of the flange portion 40. In this structure, the volume of the drum core 20 is maintained to the maximum without changing the outer diameter sizes of the flange portions 40 and 50 (while maintaining the miniaturization of the coil device 2), and the decrease in inductance can be prevented.

That is, in the present embodiment, the most of the wire-joint rising piece 62*a* (62*b*, 72*a*, 72*b*) of the terminal electrode 60 (70) including the wire-joint portion 63*a* (63*b*, 73*a*, 73*b*) shown in FIG. 3A is contained in the notch 44 of the first flange portion 40. Moreover, as shown in FIG. 1D, when the outer end surface 52 of the second flange portion 50 is viewed from the upper side in the Z-axis, the wire-joint portions 63*a*, 63*b*, 73*a*, and 73*b* shown in FIG. 1A are only partly seen at the corresponding points of the chamfered portions 54 of the second flange portion 50. Thus, the coil device 2 can be downsized, and the volume of the magnetic material of the drum core 20 including the flange portions 40 and 50 can be increased to the maximum. Thus, the inductance characteristics of the coil device 2 can be improved easily.

Moreover, in the present embodiment, the protrusion amount of the terminal electrode 60 (70) from the second flange portion 50 can be minimized with maintenance of size of the flange portions 40 and 50 without reducing the inductance, and the terminal electrode 60 and the wire joint portions 63*a*, 63*b*, 73*a*, and 73*b* are less likely to collide with a mounting device during transportation of the coil device 2.

In the present embodiment, an adhesive for attaching the attachment portions 61 and 71 to the outer end surface 42 of the flange portion 40 does not enter the recesses 46. That is, the terminal electrode 60 is attached to the outer end surface 42 of the flange portion 40 only by the attachment portions 61 and 71. In this structure, even if the coil device 2 is exposed to an environment where the temperature changes severely, the thermal stress acting on the terminal electrodes 60 and 70 is unlikely to act on the flange portion 40 of the drum core 20, and the drum core 20 is less likely to have cracks. Moreover, even in a severe temperature environment, the joint strength between the coil device and the circuit board does not deteriorate very much.

In the present embodiment, as shown in FIG. 2B, clearances each having predetermined spaces t1 and t2 are formed between the side wall surface of each recess 46 connecting to its bottom wall surface and the tip of the inner rising piece 66 (76) for entering each recess 46. In this structure, even if the coil device 2 is exposed to an environment where the temperature changes severely, the thermal stress acting on the terminal electrode 60 is unlikely to act on the flange portion 40 of the drum core 20, and the drum core 20 is less likely to have cracks. Moreover, even in a severe temperature environment, the joint strength between the coil device 2 and the circuit board 80 does not deteriorate very much.

The recess consists of four independent recesses 46 formed on the outer end surface 42 of the flange portion 40. Since the recess formed on the outer end surface 42 of the flange portion 40 consists of four independent recesses 46, the decrease in volume and strength of the drum core 20 is small, and the characteristic improvement and the compactness of the coil device 2 can be achieved at the same time. In this structure, the terminal electrodes 60 and 70 are easily insulated with each other.

In the present embodiment, as shown in FIG. 3A, the first wire-joint portion 63*a* and the second wire-joint portion 63*b* of the first terminal electrode 60 are arranged opposite to each other in the Y-axis along one side surface 40*b* of the flange portion 40, and the first wire-joint portion 72*a* and the second wire joint portion 72*b* of the second terminal electrode 70 are arranged opposite to each other in the Y-axis along the other side surface 40*b* of the flange portion 40.

In this structure, the first wire-joint portion 63*a* (73*a*) and the second wire-joint portion 63*b* (73*b*) of the terminal electrode 60 (70) are easily arranged away from each other. Thus, the leading portions 12*a*, 12*b*, 14*a*, and 14*b* of the wires 12 and 14 shown in FIG. 4 and the terminal electrodes 60 and 70 shown in FIG. 3A at the wire-joint portions 63*a*, 63*b*, 73*a*, and 73*b* are easily separately connected by, for example, laser welding. The thermal influence of the connection operation at any of the wire-joint portions 63*a*, 63*b*, 73*a*, and 73*b* is less likely to adversely affect the other wire-joint portions, and the connection reliability at the wire-joint portions is improved. Moreover, the wire-joint portions 63*a*, 63*b*, 73*a*, and 73*b* are not arranged on the outer end surface of the flange portion (the mounting surface side), but arranged on the side surfaces 40*c* of the flange portion, and the low profile of the coil device 2 can thereby be achieved.

Moreover, in the present embodiment, as shown in FIG. 3A, the first wire-joint portion 63*a* of the first terminal electrode 60 and the first wire-joint portion 73*a* of the second terminal electrode 70 are arranged diagonally across the center axis of the winding core portion 30, and the second wire-joint portion 63*b* of the first terminal electrode 60 and the second wire-joint portion 73*b* of the second terminal electrode 70 are arranged diagonally across the center axis of the winding core portion 30.

In this structure, the length from the first wire-joint portion 63*a* of the first terminal electrode 60 shown in FIG. 3A to which the first leading portion 12*a* of the first wire 12 shown in FIG. 4 is connected to the first wire joint portion 73*a* of the second terminal electrode 70 to which the second leading portion 12*b* of the first wire 12 is connected is easily substantially the same as the corresponding length of the second wire 14. The corresponding length of the second wire 14 is the length from the second wire-joint portion 63*b* of the first terminal electrode 60 to which the first leading portion 14*a* of the second wire 14 is connected to the second wire-joint portion 73*b* of the second terminal electrode 70 to which the second leading portion 14*b* of the second wire 14 is connected. When these lengths are substantially the same, the electric current flowing through the coil consisting of the first wire 12 and the electric current flowing through the coil consisting of the second wire 14 easily become substantially the same. Thus, it is easy to maximize the electric current flowing through the coil device 2.

Figure 3B:
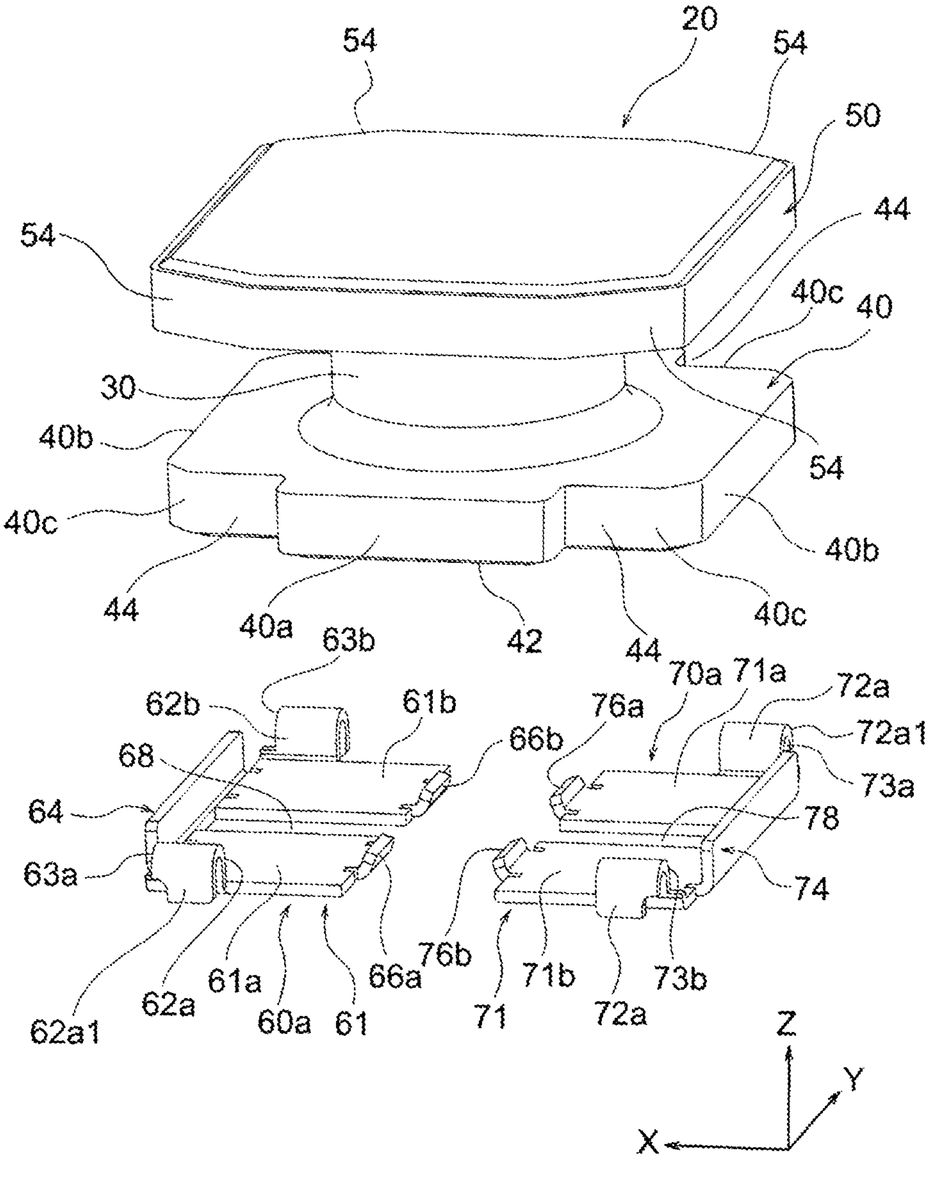
FIG. 3B is an exploded perspective view illustrating a drum core and terminal electrodes according to another embodiment of the present invention.

In the present embodiment, as shown in FIG. 3B, the first attachment piece 61 may include a pair of separate attachment pieces 61*a* and 61*b* each connecting to the first wire-joint portion 63*a* and the second wire-joint portion 63*b*. The separate attachment pieces 61*a* and 61*b* are separated by a notch 68 formed along the X-axis at a central part of the attachment piece 61 in the Y-axis. The separate attachment pieces 61*a* and 61*b* are (mechanically and electrically) connected by a single outer rising piece 64 extending in the Y-axis.

Likewise, the second attachment piece 71 may include a pair of separate attachment pieces 71*a* and 71*b* each connecting to the first wire-joint portion 73*a* and the second wire-joint portion 73*b*. The separate attachment pieces 71*a* and 71*b* are separated by a notch 78 formed along the X-axis at a central part of the attachment piece 71 in the Y-axis. The separate attachment pieces 71*a* and 71*b* are (mechanically and electrically) connected by a single outer rising piece 74 extending in the Y-axis.

Figure 5B:
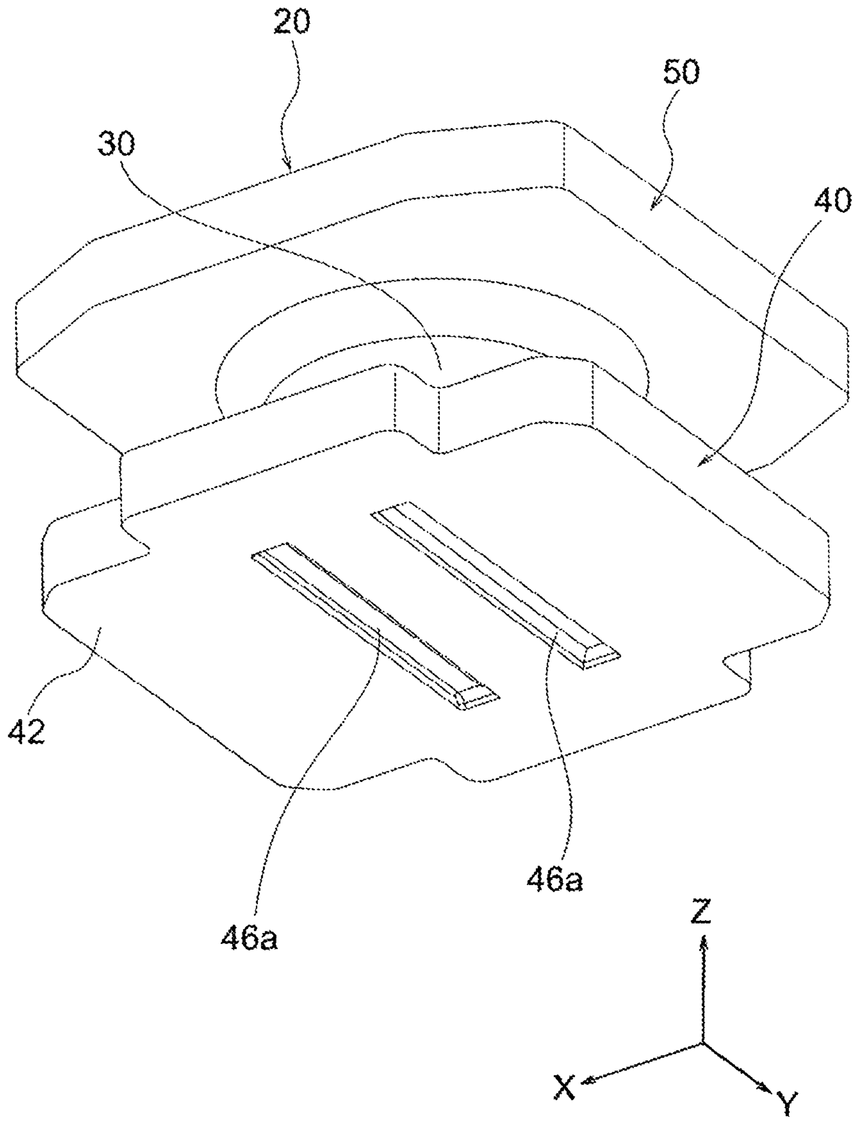
FIG. 5B is a perspective view of only a drum core used for a coil device according to another embodiment of the present invention viewed from its bottom surface side.
Figure 5C:
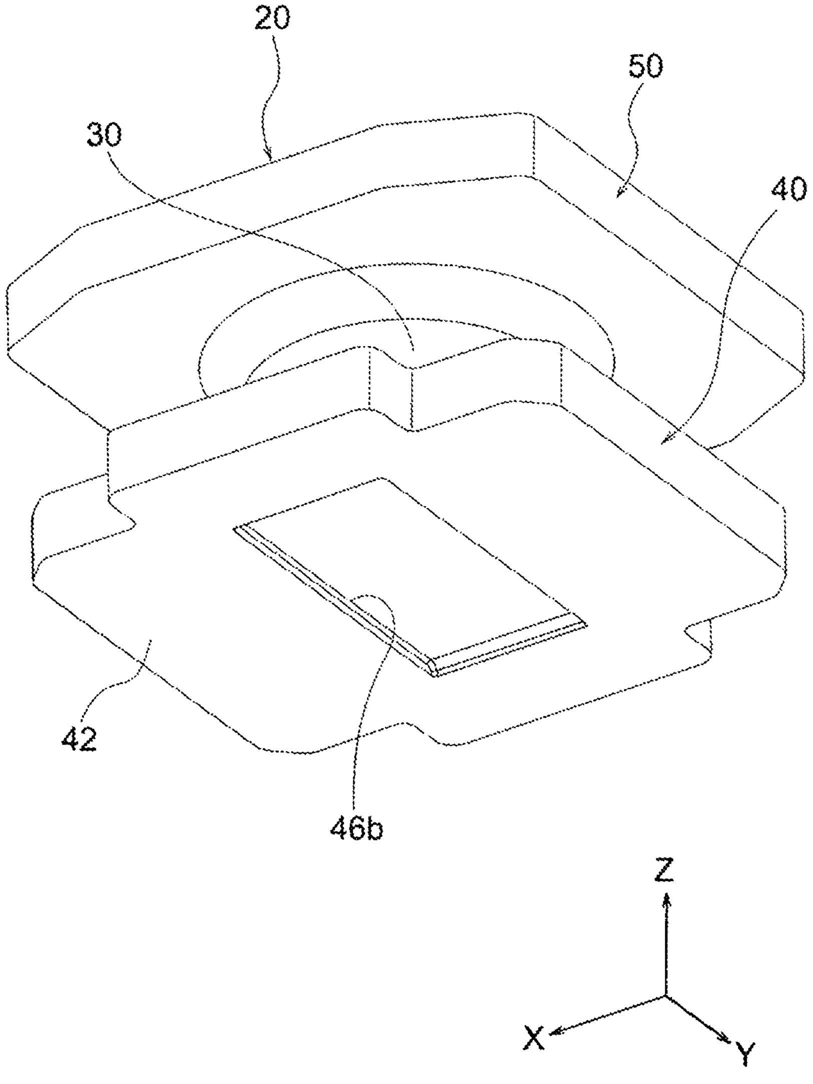
FIG. 5C is a perspective view of only a drum core used for a coil device according to further another embodiment of the present invention viewed from its bottom surface side.

In the present embodiment, as shown in FIG. 5B, two common recesses 46*a* and 46*a* may be obtained by continuing two independent recesses 46 and 46 arranged next to each other in the Y-axis shown in FIG. 5A. Instead, as shown in FIG. 5C, a single common recess 46*b* may be obtained by continuing two common recesses 46*a* and 46*a* arranged next to each other in the X-axis shown in FIG. 5B.

The present invention is not limited to the above-mentioned embodiments and can variously be modified within the scope of the present invention.

For example, the means for forming the wire-joint portions 63*a*, 63*b*, 73*a*, and 73*b* is not limited to laser welding, but may be thermocompression (300° C. or higher). The leading portions 12*a*, 12*b*, 14*a*, and 14*b* of the winding wires 12 and 14 and the terminal electrodes 60 and 70 can be connected even by thermocompression at a temperature higher than a temperature for forming the fillet of the solder 84 shown in FIG. 2B (230-280° C.). The wire-joint portions 63*a*, 63*b*, 73*a*, and 73*b* are formed by other means, such as arc welding and ultrasonic welding.

In the terminal electrodes 60 and 70 of the above-mentioned embodiments, it is preferable that the inner surfaces of the attachment portions 61 and 71 for contacting with the drum core 20 are not provided with a plating film for improvement in adhesiveness with the drum core, but the outer surface to be the joint surface with the circuit board may be tin-plated for improvement in adhesiveness with the solder 84.

In the above-mentioned embodiments, the flange portion 40 (50) has a rectangular shape as a whole when viewed from the Z-axis, but may have a circular shape, an ellipse shape, or other shapes in the present invention.

In the above-mentioned embodiments, an adhesive for attaching the attachment portions 61 and 71 of the terminal electrodes 60 and 70 does not enter the recesses 46, 46*a*, and 46*b* formed on the outer end surface of the flange portion 40, but may slightly enter the recesses 46, 46*a*, and 46*b* formed on the outer end surface of the flange portion 40. From the point of improving the adhesive force or the joint force of the terminal electrodes 60 and 70 to the outer end surface 42 of the flange portion, however, the adhesive does not enter the recesses 46, 46*a*, and 46*b* as much as possible.

DESCRIPTION OF THE REFERENCE NUMERICAL

2 . . . coil device
10 . . . coil portion
12 . . . first wire
14 . . . second wire
12*a*, 14*a* . . . first leading portion (first end)
12*b*, 14*b* . . . second leading portion (second end)
15 . . . exterior resin
20 . . . drum core (magnetic core)
30 . . . winding core portion
40 . . . first flange portion
40*a*, 40*b* . . . side surface
40*c* . . . notch side surface
42 . . . outer end surface
43 . . . inner surface
44 . . . notch
46 . . . independent recess
46*a*, 46*b* . . . common recess
50 . . . second flange portion
50*a*, 50*b* . . . side surface
52 . . . outer end surface
53 . . . inner surface
54 . . . chamfered portion
60, 60*a* . . . first terminal electrode
70,70*b* . . . second terminal electrode
61, 71 . . . attachment piece
61*a*, 61*b*, 71*a*, 71*b* . . . separate attachment piece
62*a*, 62*b*, 72*a*, 72*b* . . . wire-joint rising piece
62*a*1, 62*b*1, 72*a*1, 72*b*1 . . . hold piece
63*a*, 73*a* . . . first wire-joint portion
63*b*, 73*b* . . . second wire-joint portion
64, 64*a*, 64*b*, 74, 74*a*, 74*b* . . . outer rising piece
66*a*, 66*b*, 76*a*, 76*b* . . . inner rising piece
68, 78 . . . notch
80 . . . circuit board
82 . . . wiring pattern
84 . . . solder

What is claimed is:

1. A coil device comprising:

a magnetic core including a winding core portion, a first flange portion, and a second flange portion;

a first wire and a second wire wound around the winding core portion;

a first terminal electrode; and a second terminal electrode, wherein the first terminal electrode and the second terminal electrode are attached to the first flange portion, positioned away from each other, the first terminal electrode has a first terminal first wire-joint portion connecting a first end of the first wire and has a first terminal second wire-joint portion connecting a first end of the second wire, the second terminal electrode has a second terminal first wire-joint portion connecting a second end of the first wire and has a second terminal second wire-joint portion connecting a second end of the second wire, the first terminal first wire-joint portion, the first terminal second wire-joint portion, the second terminal first wire-joint portion, and the second terminal second wire-joint portion are respectively arranged at four diagonally opposing positions located at side surfaces of the first flange portion, the first terminal first wire-joint portion and the first terminal second wire-joint portion are arranged at opposite positions along one of the side surfaces of the first flange portion, among the four diagonally opposing positions located at the side surfaces, and the second terminal first wire-joint portion and the second terminal second wire-joint portion are arranged at opposite positions along the surface opposite to the one of the side surfaces of the first flange portion, among the four diagonally opposing positions located at the side surfaces.

2. The coil device according to claim 1, wherein the first terminal first wire-joint portion and the second terminal first wire-joint portion are arranged at diagonally opposing positions among the four diagonally opposing positions located at the side surfaces, and the first terminal second wire-joint portion and the second terminal second wire-joint portion are arranged at diagonally opposing positions among the four diagonally opposing positions located at the side surfaces.

3. The coil device according to claim 1, wherein the first terminal electrode includes a first attachment piece attached to an outer end surface of the first flange portion, and the second terminal electrode includes a second attachment piece attached to an outer end surface of the first flange portion.

4. The coil device according to claim 3, wherein the first terminal electrode further includes wire-joint rising pieces, the wire-joint rising pieces are each provided with the first terminal first wire-joint portion and the first terminal second wire-joint portion and rise from opposite edges of the first attachment piece toward respective side surfaces of the first flange portion, and the second terminal electrode further includes wire-joint rising pieces, the wire-joint rising pieces are each provided with the second terminal first wire-joint portion and the second terminal second wire-joint portion and rise from opposite edges of the second attachment piece toward respective side surfaces of the first flange portion.

5. The coil device according to claim 4, wherein notches are formed on the side surfaces of the first flange portion where the wire-joint rising pieces are arranged.

6. The coil device according to claim 3, wherein the first terminal electrode or the second terminal electrode further includes an outer rising piece rising from an edge of the first attachment piece or the second attachment piece toward one of the side surfaces of the first flange portion.

7. The coil device according to claim 6, wherein the first terminal electrode includes a pair of separate attachment pieces connecting to the first terminal first wire-joint portion and the first terminal second wire-joint portion, respectively, and the separate attachment pieces are connected by the outer rising piece.

8. The coil device according to claim 3, wherein the first terminal first wire-joint portion and the first terminal second wire-joint portion are connected by the first attachment piece.

9. The coil device according to claim 1, wherein a recess is formed on an outer end surface of the first flange portion, and the first terminal electrode or the second terminal electrode includes an inner rising piece for loosely entering the recess.

10. The coil device according to claim 9, wherein a clearance having a predetermined space is formed between a side wall connecting to a bottom wall of the recess and a tip of the inner rising piece entering the recess.

* * * * *